United States Patent
Richard et al.

(10) Patent No.: US 12,385,440 B2
(45) Date of Patent: Aug. 12, 2025

(54) FIRE SAFETY SYSTEM FOR A TURBOMACHINE COMPRISING MEANS FOR MAINTAINING A COOLING AIR SPEED AND CORRESPONDING TURBOMACHINE

(71) Applicant: SAFRAN HELICOPTER ENGINES, Bordes (FR)

(72) Inventors: Stéphane Raphaël Yves Richard, Moissy-Cramayel (FR); Jean-Luc Breining, Moissy-Cramayel (FR); Mathieu Pierre Cladiere, Moissy-Cramayel (FR); Olivier Pierre Descubes, Moissy-Cramayel (FR); Jerome Dinquel, Moissy-Cramayel (FR); Gabriel Gorka Exilard, Moissy-Cramayel (FR); Bertrand Guillaume Robin Pellaton, Moissy-Cramayel (FR); Nicolas Christophe Perra, Moissy-Cramayel (FR); Christophe Nicolas Henri Viguier, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/576,677

(22) PCT Filed: Jul. 7, 2022

(86) PCT No.: PCT/FR2022/051362
§ 371 (c)(1),
(2) Date: Jan. 4, 2024

(87) PCT Pub. No.: WO2023/281221
PCT Pub. Date: Jan. 12, 2023

(65) Prior Publication Data
US 2024/0318602 A1    Sep. 26, 2024

(30) Foreign Application Priority Data

Jul. 9, 2021  (FR) ......................... 2107487

(51) Int. Cl.
*F02C 7/25*   (2006.01)
*B64D 45/00*  (2006.01)
*F01D 25/12*  (2006.01)

(52) U.S. Cl.
CPC ............... *F02C 7/25* (2013.01); *B64D 45/00* (2013.01); *F01D 25/12* (2013.01); *B64D 2045/009* (2013.01); *F05D 2260/232* (2013.01)

(58) Field of Classification Search
CPC . F02C 7/25; F01D 5/082; F01D 21/14; B64D 2045/009; F05D 2240/14
See application file for complete search history.

(56) References Cited

U.S. PATENT DOCUMENTS

| 4,541,774 A | * | 9/1985 | Rieck | ................ F01D 5/085 |
| | | | | 415/115 |
| 4,759,688 A | | 7/1988 | Wright et al. | |

(Continued)

FOREIGN PATENT DOCUMENTS

| EP | 2 192 268 A2 | 6/2010 |
| EP | 3 159 490 A1 | 4/2017 |
| FR | 2 960 020 A1 | 11/2011 |

OTHER PUBLICATIONS

International Search Report mailed Sep. 29, 2022, issued in corresponding International Application No. PCT/FR2022/051362, filed Jul. 7, 2022, 7 pages.

(Continued)

*Primary Examiner* — Courtney D Heinle
*Assistant Examiner* — Danielle M. Christensen
(74) *Attorney, Agent, or Firm* — CHRISTENSEN O'CONNOR JOHNSON KINDNESS PLLC

(57) ABSTRACT

An assembly for a turbomachine includes at least one turbine having a turbine disc with an internal bore and an (Continued)

annular cavity which is arranged upstream of the disc. The assembly further includes a fire safety system with a cooling device that supplies the cavity with cooling air via injection means. The fire safety system includes means that divide the annular cavity into first and second cavities. A cooling air speed is maintained at the outlet of the injection means and the cooling air in the first cavity is guided to the internal bore of the turbine disc. A diffuser co-operates with the injection means and an annular cover co-operates with the diffuser and covers first attachment members arranged in the cavity. A radially outer surface of the cover at least partially guides the cooling air at the outlet of the diffuser.

13 Claims, 7 Drawing Sheets

(56) References Cited

U.S. PATENT DOCUMENTS

| | | | |
|---|---|---|---|
| 4,882,902 A | 11/1989 | Reigel et al. | |
| 5,226,785 A * | 7/1993 | Narayana | F01D 5/02 416/198 A |
| 6,398,487 B1 * | 6/2002 | Wallace | F01D 5/082 415/115 |

OTHER PUBLICATIONS

Written Opinion mailed Sep. 29, 2022, issued in corresponding International Application No. PCT/FR2022/051362, filed Jul. 7, 2022, 6 pages.

* cited by examiner

FIRE SAFETY SYSTEM FOR A TURBOMACHINE COMPRISING MEANS FOR MAINTAINING A COOLING AIR SPEED AND CORRESPONDING TURBOMACHINE

FIELD OF THE DISCLOSURE

This disclosure relates to the general field of the turbomachines. In particular, it is aimed at a fire safety system installed in a cavity supplied with cooling air, close to a hot area of a turbomachine, and which comprises means for maintaining a speed of the cooling air entering the cavity. The disclosure also concerns a turbomachine comprising such a fire safety system.

BACKGROUND

The prior art comprises the documents FR-A1-2960020, EP-A2-2192268, U.S. Pat. Nos. 4,882,902, 4,759,688, and EP-A-3159490.

A turbomachine for an aircraft generally comprises, from upstream to downstream and following the direction of gas flow in the turbomachine, a compressor section, a combustion chamber and a turbine section. The compressor section comprises, for example, a low-pressure compressor and a high-pressure compressor, and the turbine section comprises, for example, a high-pressure turbine and a low-pressure turbine. The turbomachine can comprise a free turbine that is driven by the gases leaving the high-pressure turbine or the low-pressure turbine located upstream of it. The rotating parts of these compressors and/or turbines, such as shafts and wheels, are driven and/or guided in rotation by rolling bearings housed in cooling and lubrication enclosures. The cooling and lubrication enclosures are located close to areas referred to as hot areas, which are generally exposed to high temperatures because those parts are passed through by the gases of the turbomachine.

To this end, the turbomachines are equipped with a lubrication system allowing to lubricate and/or cool the roller bearing or bearings required to guide the shafts, which are mounted in the cooling and lubrication enclosures. The turbomachines are also equipped with a cooling device allowing to cool parts located in hot areas of the turbomachine and to pressurize the enclosures. In general, the lubrication system and the cooling device are arranged in confined spaces that favor the proximity of the lubrication circuit of the lubrication system to rotor parts located in the hot areas of the turbomachine. In the event of leakage, the lubricant in these areas may encounter conditions of temperature, pressure, cooling air flow speed and cooling air turbulence levels that are conducive to self-ignition. This risk of self-ignition could lead to damage to the rotor parts, or even breakage and/or release of the parts rotating at high speed.

The disclosure is intended to avoid the aforementioned disadvantages.

SUMMARY

The aim of the disclosure is to provide an optimum solution allowing to limit or even prevent the ignition of a combustible fluid in a hot area of the turbomachine, while at the same time being simple and economical.

This is achieved in accordance with the disclosure by means of a fire safety system for a turbomachine, such as an aircraft turbojet or turboprop engine, the turbomachine comprising at least one turbine having a turbine disc, an annular cavity which is arranged upstream of the disc and which comprises an internal bore, and a cooling device intended to supply the cavity with cooling air via injection means, the fire safety system comprising means configured in such a way as on the one hand to divide the annular cavity into a first cavity and into a second cavity and, on the other hand, maintain a speed of the cooling air at the outlet of the injection means and guide the cooling air in the first cavity towards the internal bore of the turbine disc.

Thus, this solution allows to achieve the above-mentioned objective. In particular, such means prevent any flame following a fire in the cavity from being stabilized. The configuration of these means allows to maintain the flow speed of the cooling air from the outlet of the injection means towards the internal bore of the turbine disc, and to avoid the recirculation of cooling air in the cavities, particularly the first cavity close to the turbine (free or linked) so as not to stabilize a fire there.

The fire safety system comprises one or more of the following characteristics, taken alone or in combination:

- the means comprise a diffuser cooperating with the injection means and an annular cowling intended to cooperate with the diffuser and to cover first attachment members arranged in the cavity, the diffuser and the cowling being configured in such a way that the cooling air leaving the diffuser is guided at least in part by a radially external surface of the cowling.
- the diffuser is provided with channels intended to be in fluidic communication with the injection means.
- the annular cowling is designed to be mounted on a cover of the turbomachine.
- the annular diffuser extends between an upstream edge and a downstream edge along an axis D, the channels being formed in the thickness of an annular wall of the diffuser, the channels each having an evolving profile and each opening out, on the one hand in the upstream edge through a plurality of slits, and on the other hand in the downstream edge in an annular opening, the slits being arranged around the axis D and being in fluidic communication with the injection means of the cooling air device.
- the diffuser has a predetermined length between the upstream edge and the downstream edge, the downstream edge being intended to be substantially flush with a radially internal free end of a first flask mounted upstream of the turbine disc and with a predetermined clearance.
- the fire safety system is designed according to a geometric law defined by the following formula:

$$\alpha < \frac{39}{\sqrt{L/LC}}$$

with α being a predetermined angle measured between a first straight line passing through a summit of a slit, parallel to a respective main axis of the channels, and a second straight line tangential to a flank of a channel, L being the predetermined length of the diffuser and LC being the circumferential width of each slit.

- the turbomachine comprises a support for a guide bearing of a turbine shaft which comprises a first radial flange, and a cover equipped with a second radial flange intended to be attached to the first radial flange by first attachment members, the first attachment members being evenly distributed around the longitudinal axis X and the cover comprising an annular wall intended to pass through the internal bore of the turbine disc.

the annular cowling is intended to be mounted on the cover, the cowling comprising an annular bottom wall intended to be attached to an annular bearing surface of the cover.

the annular cowling comprises an annular skirt extending from the bottom wall along an axis C of the cowling, the annular skirt comprising a tubular segment and a frustoconical segment connecting the tubular segment to the bottom wall along the axis C, the cowling comprising a predetermined radius of curvature arranged, on the one hand, between the tubular segment and the frustoconical segment and, on the other hand, between the frustoconical segment and the bottom wall.

the cowling has an annular border disposed adjacent a downstream end of a radially internal wall of the diffuser, the diffuser comprising a radially external wall having a downstream border arranged radially outside the cowling and spaced from the cowling.

the turbine disc comprises an annular rim extending circumferentially about the longitudinal axis and axially upstream along the longitudinal axis, a segment of a cooling air flow duct being bounded at least in part by a radially internal surface of the annular rim and the radially external surface of the cowling.

the ratio between the predetermined radius of curvature and the height of the cooling air flow duct is greater than 1.

the free end of the flask is annular and surrounds an annular rim of the turbine disc radially on the outside.

the system is configured so that the ratio of the turbulent flame speed to the flow speed of an air/oil mixture is less than 1.

the tubular segment of the cowling comprises the annular border.

the predetermined length of the diffuser is intended to be less than or equal to a distance measured between a distal end of an annular rim of the turbine disc and the injection means.

the attachment members each comprise a head and in that the bottom wall comprises housings which each open into a third hole, each housing being intended to house and contain the head of the attachment members.

the number of attachment members is between 4 and 8.

the diffuser is produced by an additive manufacturing method or selective powder fusion.

each slit is in fluidic communication with an injector of the injection means.

the predetermined angle α being between 9° and 24°.

the flow duct comprises a flow duct segment formed by a segment of the radially external wall of the diffuser and a segment of the wall of the cowling.

the diffuser is centered on the longitudinal axis of the turbomachine.

the cowling is centered on the longitudinal axis of the turbomachine.

The disclosure also relates to a turbomachine, in particular for an aircraft, having a longitudinal axis X and comprising a turbine connected by a shaft providing mechanical power, a cavity arranged upstream of a first stage of the turbine, a cooling device equipped with injection means, and a fire safety system as mentioned above, the fire safety system being arranged in the cavity and the injection means being in fluidic communication with the channels of the cooling system.

The turbomachine comprises one or more of the following characteristics, taken alone or in combination:

a first flask is arranged upstream of the turbine disc, the downstream edge of the diffuser being positioned close to a radially internal end of the first flask with the predetermined clearance.

the turbine is arranged downstream of a turbine section.

the shaft is a power shaft providing a mechanical power to an output shaft.

the turbine is a linked turbine or a free turbine.

the second cavity extends radially outside the first cavity.

The disclosure further relates to an aircraft comprising at least one turbomachine as above-mentioned.

DESCRIPTION OF THE DRAWINGS

The disclosure will be better understood, and other purposes, details, characteristics and advantages thereof will become clearer upon reading the following detailed explanatory description of embodiments of the disclosure given as purely illustrative and non-limiting examples, with reference to the appended schematic drawings in which.

DETAILED DESCRIPTION

Figure 1:
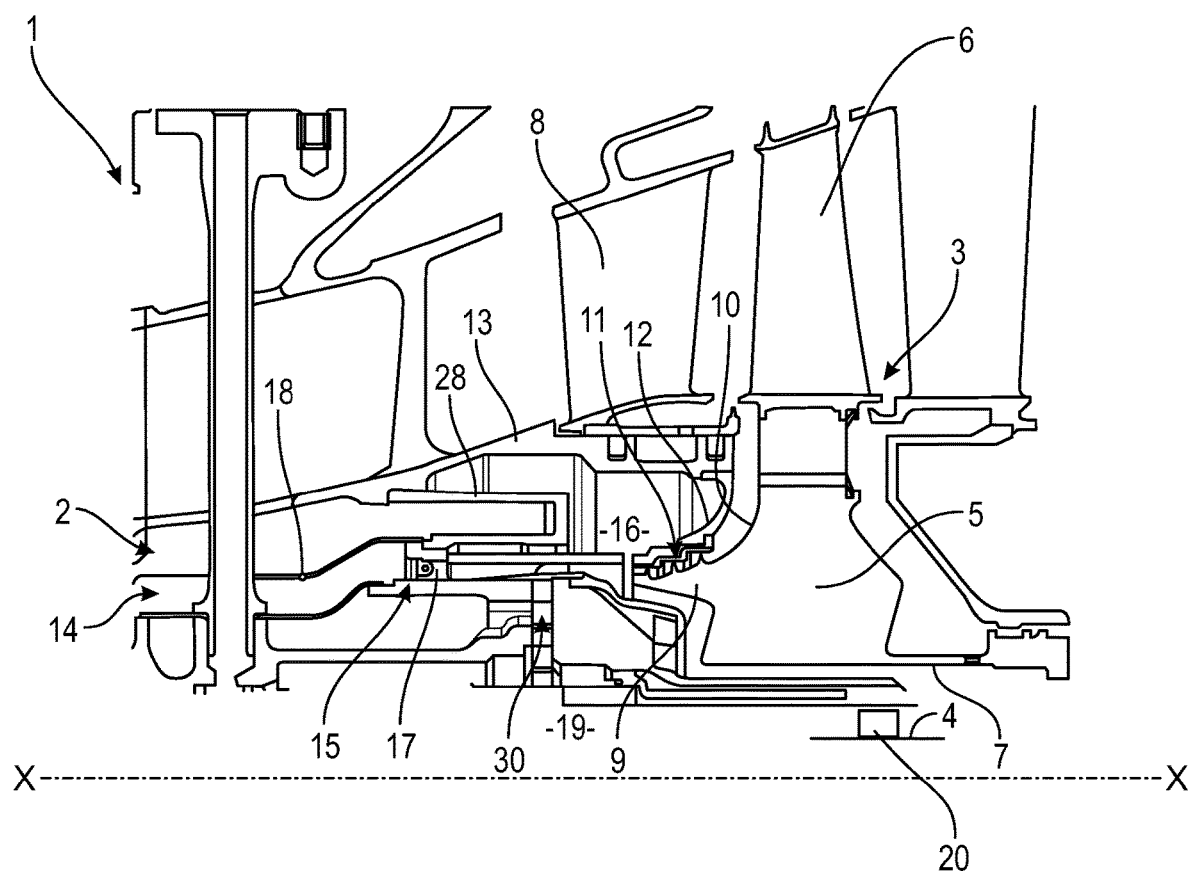
FIG. 1 shows a partial axial cross-section of an example of a turbomachine comprising at least one turbine according to the disclosure.

FIG. 1 shows partly a turbomachine 1, such as a turbojet, a turboprop or a turboshaft engine. This turbomachine is designed to be mounted in an aircraft such as an airplane or a helicopter.

In the present application, the terms "upstream", "downstream", "axial" and "axially" are defined with respect to the flow direction of the gases in the turbomachine and also along the longitudinal axis X (and even from left to right in FIG. 1). The terms "radial," "radially", "internal", and "external" are also defined with respect to a radial axis Z that is perpendicular to the axis X of the turbomachine.

Generally speaking, a turbomachine, in particular an aircraft turbomachine, with a longitudinal axis X, comprises, from upstream to downstream and in the direction of flow of the gas or air flows, a compressor section, a combustion chamber and a turbine section. These elements form a gas generator 2. The compressor section may comprise a low-pressure compressor and a high-pressure compressor. The turbine section may comprise a low-pressure turbine and a high-pressure turbine. These turbines are referred to as "linked turbines". Each compressor (low or high pressure) and each turbine (low or high pressure) comprises one or more stages respectively. Each stage comprises a wheel of movable vanes which is mounted upstream or downstream of a wheel of stationary vanes (or stator vanes). The rotors of the low-pressure compressor and of the low-pressure turbine are connected to each other by a low-pressure shaft centered on the longitudinal axis X to form a low-pressure body. Similarly, the rotors of the high-pressure compressor and of the high-pressure turbine are connected to each other by a high-pressure shaft centered on the longitudinal axis X to form a high-pressure body. The turbomachine may comprise a fan (not shown) upstream of the compressor section. Downstream of the turbine section, it may also comprise a gas exhaust nozzle. The air entering the compressor section passes through the combustion chamber which emits combustion gases towards the turbine section comprising at least one linked turbine.

Referring to FIG. 1, the turbomachine comprises an additional turbine 3, referred to as the free turbine, which is mounted downstream of the gas generator 2. In particular, the free turbine is mounted downstream of the high-pressure turbine or of the low-pressure turbine (of the turbine section). The gases from the gas generator 2 are sent to the free turbine 3, which drives a power shaft 4. In this example, the free turbine 3 is placed upstream of the exhaust nozzle or in place of it. The power shaft provides the useful mechanical power to an output shaft for the thrust of the aircraft. The power shaft is separate from and coaxial with the high pressure and/or low pressure shafts. The free turbine 3 comprises a turbine stage with a movable wheel and a stationary wheel. The movable wheel comprises an annular disc 5 from which a number of movable vanes 6 extend radially. These are evenly distributed around the disc 5 and pass through a primary duct in which a primary flow circulates. The disc 5 is driven in rotation about the longitudinal axis X by a shaft (in this case the power shaft) which passes through its internal bore 7 (facing the axis X). The stationary wheel is made up of stationary vanes, referred to as turbine stators 8, which are arranged upstream of the movable vanes 6.

The disc 5 comprises an annular rim 9 which extends from a web 10 of the disc 5 along the longitudinal axis. The annular rim 9 also extends circumferentially around the longitudinal axis X. The annular rim 9 carries a sealing device 11 designed to cooperate with a radially internal free end 12a of a first flask 12. The sealing device 11 is advantageously a labyrinth seal which comprises a plurality of sealing elements or blades extending radially and circumferentially around the longitudinal axis from the wall of the annular rim 9. These sealing elements are also arranged parallel along the longitudinal axis X.

Figure 2:
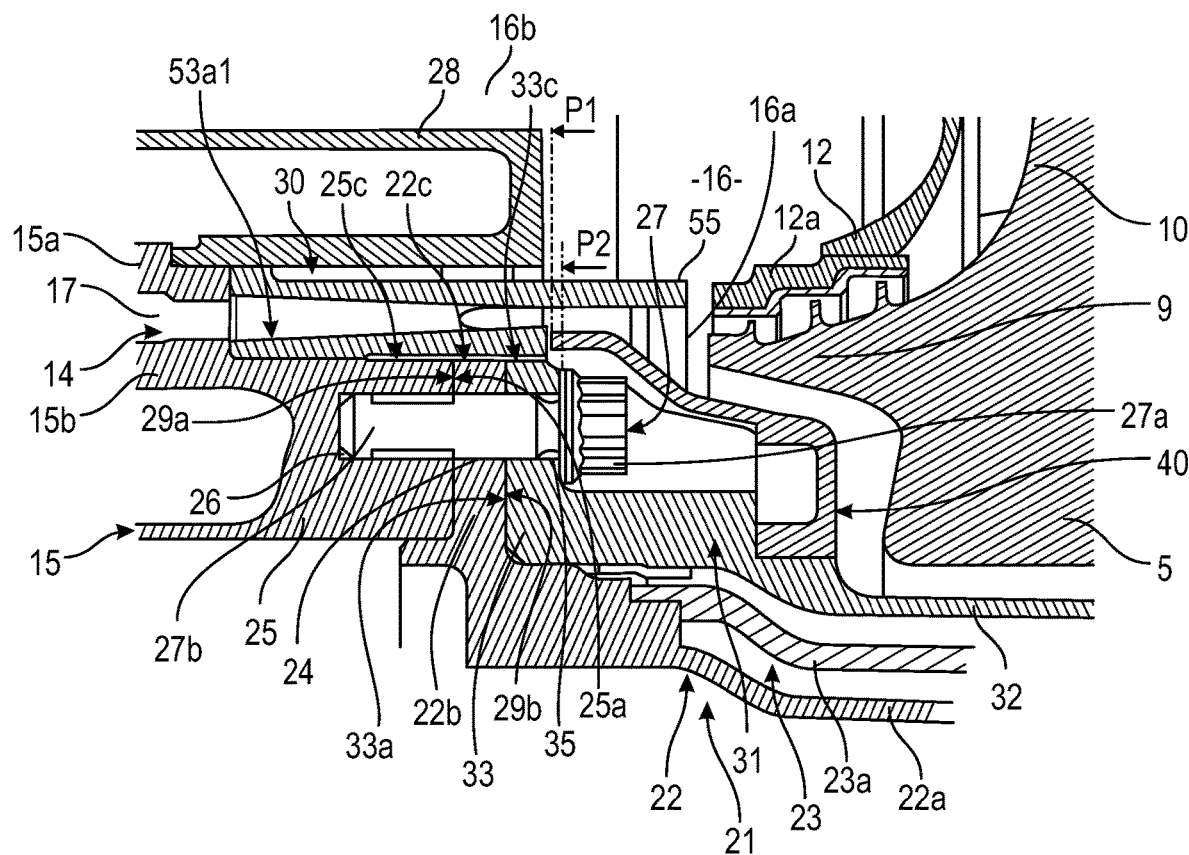
FIG. 2 is an axial cross-sectional view of a fire safety system in a pressurized cavity according to the disclosure.

With reference to FIGS. 1 and 2, the first flask 12 is mounted upstream of the disc 10. More specifically, the first flask 12 is annular and is mounted upstream of the web 10 of the disc 5. The radially internal end 12a also has an abradable coating facing the sealing elements to ensure that the sealing device 11 is airtight. The first flask 12 is also connected to a radially internal platform 13 of the upstream turbine stators.

With reference to FIGS. 1 and 2, the turbomachine 1 generally comprises a cooling device 14 for the disc 5 of the free turbine 3 (or one of the linked turbines). The cooling device 14 is supplied with air taken from upstream of the turbomachine. Generally, the cooling air is taken from the high-pressure or low-pressure compressor. The cooling device 14 comprises an external piping (not shown) which bypasses the discs of the turbine section through which a cooling air circulates. The external piping is coupled to an internal pipe 18 which is also connected to a rear bearing housing 15 which comprises a first wall 15a and a second wall 15b connected to a stationary structure of the turbomachine.

The housing 15 is a part of revolution about the longitudinal axis. The cooling device 14 comprises injection means designed to project cooling air into an annular cavity 16 arranged upstream of the disc 5 of the free turbine. The injection means are formed in the rear bearing housing 15. In particular, this annular cavity 16 is located upstream of the first stage of the free turbine 3. The injection means comprise injectors 17 which are coupled to the air pipe 18 and open into the annular cavity 16. The injectors 17 are orifices. Alternatively, the injectors are nozzles. The injectors 17 are evenly distributed around the longitudinal axis and are advantageously positioned substantially opposite the disc 5 of the free turbine 3. Each injector 17 has an axis parallel to the longitudinal axis X. In this example, there are thirty-two injectors 17.

A structural part 28 is mounted on the rear bearing housing 15. The structural part 28 is an annular part which has an axis centered on the longitudinal axis X and which has a U-shaped (pin-shaped) radial cross-section. This provides the link between the housing 15 and the turbine stators 8. In particular, it provides a link between the "hot" portion and the "cold" portion of the rear bearing housing 15. It is also flexible. Thanks to its flexibility, the structural part 28 absorbs the deformations caused by thermal variations.

The turbomachine 1 comprises a number of bearings to guide the low-pressure shaft, the high-pressure shaft and/or the power shaft of the free turbine 3 in rotation. The bearings are generally arranged in different enclosures, such as the lubrication and cooling enclosure 19, which are supplied with lubricant, in this case oil in the form of a mist, from a lubrication system. The enclosure 19 is pressurized to contain the oil in a sealed manner and also in the form of a mist. The oil mist allows to distribute the oil evenly over the members of the turbomachine to be lubricated.

The pressurization of the enclosure 19 is achieved by injecting air taken from the compressor or compressors or from the fan. The air used to pressurize the enclosures follows the same circuit as that used to cool the discs. Preferably, the cooling air is taken from upstream of the fan so that the temperature of the cooling air is not too high and so that it can effectively cool the members of the turbomachine. The annular cavity 16 is arranged radially around the enclosure 19 and is separated from it by a cover 31. The cover 31 itself is positioned radially on the outside of a bearing support which partly delimits the enclosure 19.

With reference to FIG. 1, the power shaft is guided in rotation by a bearing 20 located downstream of it and which is arranged in the enclosure 19. This bearing 20 cooperates with the downstream bearing support 21, which is generally attached to a stationary structure of the turbomachine. Advantageously, the downstream bearing 20 is a rolling bearing. The latter comprises an internal ring and an external ring between which the rolling members are arranged. The rolling members are, for example, rollers.

Figure 3:
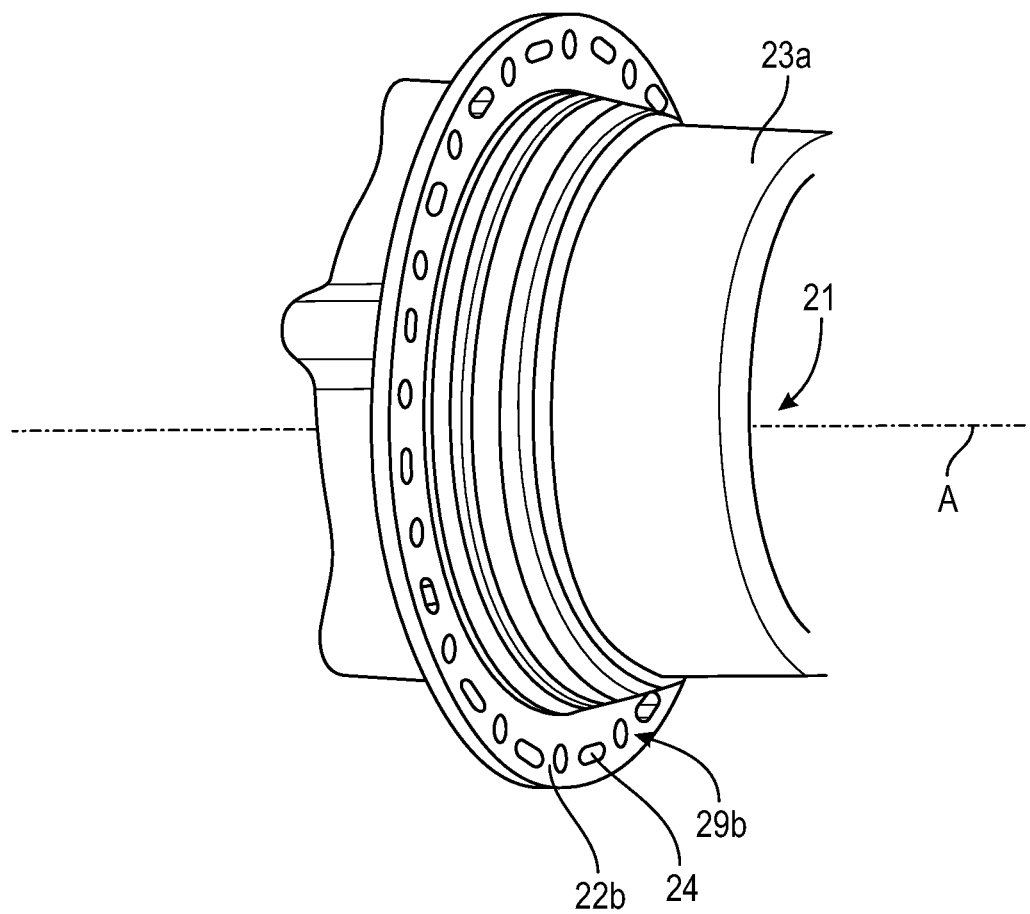
FIG. 3 is a perspective view of an example of a guide bearing support for a power shaft of a turbomachine according to the disclosure.

In FIG. 2 and FIG. 3, the bearing support 21 has a form of revolution extending around an axis A which is coaxial with the longitudinal axis X of the turbomachine in the installation situation. The bearing support 21 consists of two portions, hereinafter referred to as the first shell 22 and the second shell 23. More specifically, the first shell 22 comprises a first annular wall 22a and a first radial attachment flange 22b which extends radially outwards from a radially external surface of the first annular wall 22a. Advantageously, the first shell 22 is made in one piece (came from one material). The first annular wall 22a supports the external ring of the downstream bearing 20. The internal ring of the downstream bearing 20 cooperates with means mounted on the power shaft. The second shell 23 comprises a second annular wall 23a which is mounted on the first shell 22a and extends radially outside the first annular wall 22a. The second annular wall 23a passes at least partly through the internal bore 7 of the disc 5 of the free turbine 3 along the longitudinal axis X. The second annular wall 23a supports a static portion of a seal made by a labyrinth which is located between the enclosure 19 and the annular cavity 16.

The bearing support 21 is attached to the stationary structure via the rear bearing housing 15. In particular, the first radial flange 22b is designed to be attached to the second wall 15b of the rear bearing housing 15. To this end, the first radial flange 22b comprises a plurality of first holes 24 passing through the wall of the first radial flange 22b on either side along an axis parallel to the longitudinal axis X. The first holes 24 are evenly distributed around the longitudinal axis. The second wall 15b of the rear bearing housing 15 also comprises a radial segment 25 in which a number of blind holes 26 are formed. The blind holes 26 extend along an axis parallel to the longitudinal axis X. These are intended to cooperate with the first holes 24 in the first radial flange 22b. There are as many blind holes 26 as there are first attachment holes 24. Advantageously, first attachment members 27 such as screws, stems and/or bolts, etc. are used to attach the bearing support 21 to the housing 15. In the example shown, the first attachment members 27 comprise screws with a head 27a and a stem 27b. Advantageously, as can be seen in FIG. 2, the first attachment members 27 are arranged in the cavity 16.

The first radial flange 22b comprises a first support surface 29a which is defined in a radial plane perpendicular to the axis A of the bearing support. The first radial flange 22b also comprises a second support surface 29b which is defined in a plane perpendicular to the axis A. The first and second bearing surfaces 29a, 29b are opposite each other along the longitudinal axis X.

The radial segment 25 also comprises a downstream support surface 25a which is defined in a plane perpendicular to the longitudinal axis X. The first support surface 29a of the first radial wall 22b is intended to bear against the downstream support surface 25a. These create a bearing-plane connection. In the present example, the first radial flange 22b comprises an annular edge which has an annular surface 22c flush with a radially external surface 25c of the radial segment 25 so as not to disturb the flow of cooling air leaving the cooling device 14.

Figure 4:
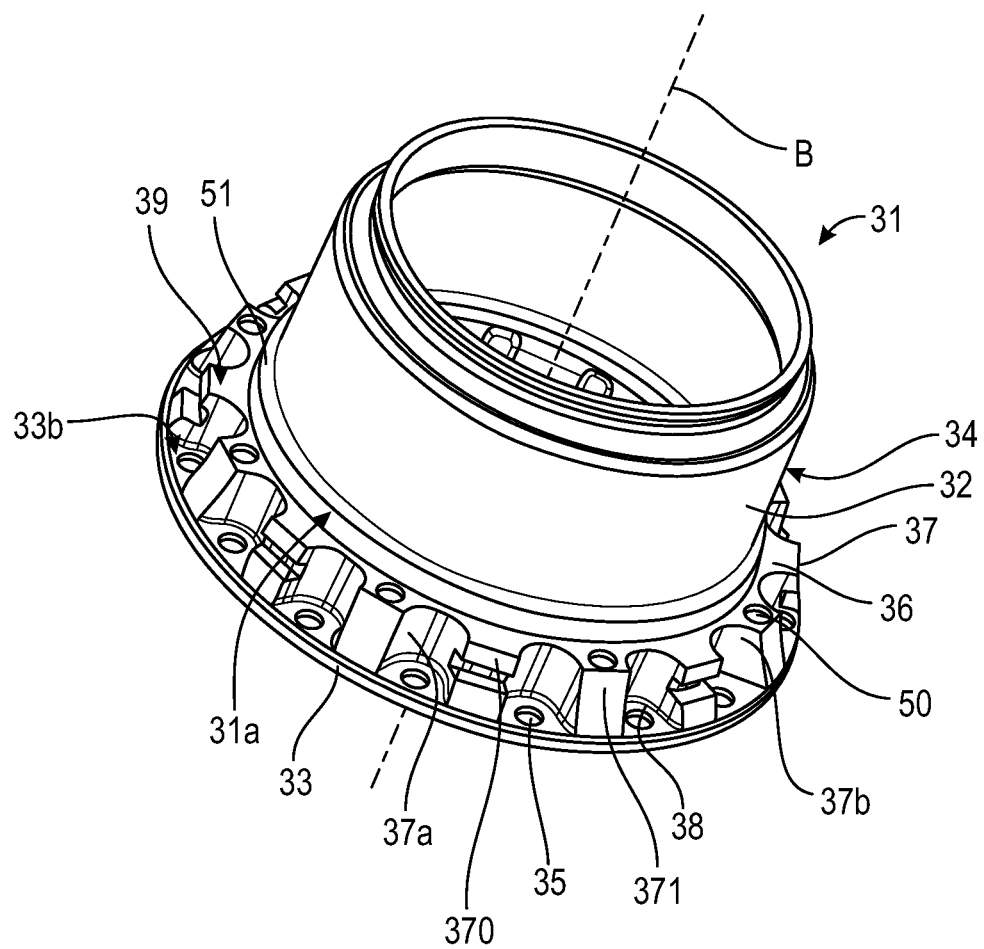
FIG. 4 is a perspective view of an example of a cover intended to be mounted on a bearing support according to the disclosure.

FIG. 4 shows the cover 31. The latter is designed to be mounted on the bearing support 21. The cover 31 is installed in the annular cavity 16 and the cooling air leaving the injectors circulates around it and towards the bore 7. The cover 31 comprises a shape of revolution about an axis B. The axis B is coaxial with the longitudinal axis X in the installation situation. The cover 31 comprises a second radial flange 33 which is intended to be attached to the first radial flange 22b of the bearing support 21. The first radial flange 22b is attached to the second radial flange 33 by means of the first attachment members 27 (shown in FIG. 5). The cover 31 also comprises an annular wall 32 which extends along the axis B and at least partly through the internal bore of the turbine disc. The second radial flange 33 extends radially outwards from a radially external surface 34 of the annular wall 32. The annular wall 32 has an internal diameter which is greater than the external diameter of the second shell 23 (in particular the second annular wall 22a) of the bearing support 21. These first attachment members 27 are evenly distributed around the longitudinal axis X. To this end, the second radial flange 33 comprises a plurality of second holes 35 which each pass through the wall of the radial flange 33 on either side along an axis parallel to the longitudinal axis X. The second holes 35 are intended to cooperate with the first holes 24 of the first radial flange 22b. In the installation situation, the first and second holes 24, 35 are coaxial.

The second radial flange 33 comprises an upstream support surface 33a (see FIG. 2) which is defined in a radial plane perpendicular to the axis B of the cover 31. The upstream support surface 33a is designed to bear against the second support surface 29b of the first flange 22b so as to create a bearing-plane connection. The second radial flange 33 also comprises an annular edge which has an annular surface 33c substantially flush with the surface 22c of the first flange.

As shown in FIG. 4, the cover 31 comprises an annular bearing surface 36 extending radially outwards and downstream of the second radial flange 33. In particular, the cover 31 comprises a plurality of projections 37 which extend radially outwards from the radially external surface 34 of the annular wall 32 and which are evenly distributed around the axis of the cover 31. The projections 37 also extend from a downstream surface 33b of the second radial flange 33 along the longitudinal axis X. The downstream surface 33b is axially opposite the upstream support surface 33a. The annular bearing surface 36 is formed by the projections 37. The projections 37 are defined by recesses 38 into which the second attachment holes 35 of the second radial flange 33 open. In other words, the projections 37 are disposed alternately with the second holes 35 around the longitudinal axis. The recesses 38 are oriented substantially parallel to the longitudinal axis and each have a semi-cylindrical cross-section.

The projections 37 are delimited circumferentially by lateral panels 37a, 37b (which are also the walls of the recesses). These are also each delimited downstream by a downstream support surface 39. The latter forms an annular downstream support surface for the annular bearing surface 36. The downstream support surface 39 is defined in a plane perpendicular to the longitudinal axis X.

The turbomachine 1 also comprises a fire safety system 30 configured to suppress the outbreak of a fire in the cavity 16 or even to eliminate any possibility of ignition in the cavity 16. The enclosure 19 with the suspended oil is close to the cavity 16, which receives cooling air via the cooling device 14. The oil, the cooling air and the heat in this area could allow a combustion and a fire to start, generating a flame in this area and in the cavity 16 in the event of oil leaking from the enclosure into the cavity. A fire could cause severe damage to rotor parts, or even the release of portions of high-energy parts.

When a flame is generated in a cavity exposed to the flow of a mixture of a first fluid (air) and a second combustible fluid (oil), the flame can be stabilized if the flame velocity is sufficient to exceed the flow speed of the cooling air in the cavity. The flame speed depends on cooling air temperature, pressure and oil concentration.

The maximum possible flame speed is the speed of the turbulent flame ST at the maximum folding rate. It is assumed that the cooling air/oil mixture is stoichiometric to maximize the laminar flame speed, that there is no heat transfer to the walls of the cavity to maximize the laminar flame speed and that the folding rate is at saturation to maximize the flame pucker factor. The laminar flame speed is a constituent of fuels (petrol, paraffin, diesel, etc.).

The system 30 is configured so that the ratio of flame speed to cooling air flow speed is less than 1. In particular, the system 30 comprises holding means configured so as to maintain a speed of the cooling air at the outlet of the injection means and to guide the cooling air through the bore of the turbine disc of the first turbine stage. By maintaining the exit speed of the cooling air from the injection means and avoiding recirculation, it is possible to control and prevent the stabilization of the flame generated in the cavity.

Advantageously, the fire safety system 30 comprises an adaptation member for adapting the speed of the cooling air leaving the injection means of the cooling device 14. In particular, the adaptation member is configured so as to maintain the speed at the output of the injectors 17. In this example, this member is a diffuser 52 which cooperates with the injection means (in this case the injectors). The diffuser 52 also allows to guide the cooling air towards the bore 7 of the disc 5 of the free turbine. The adaptation member is part of the speed maintenance means.

Figure 6:
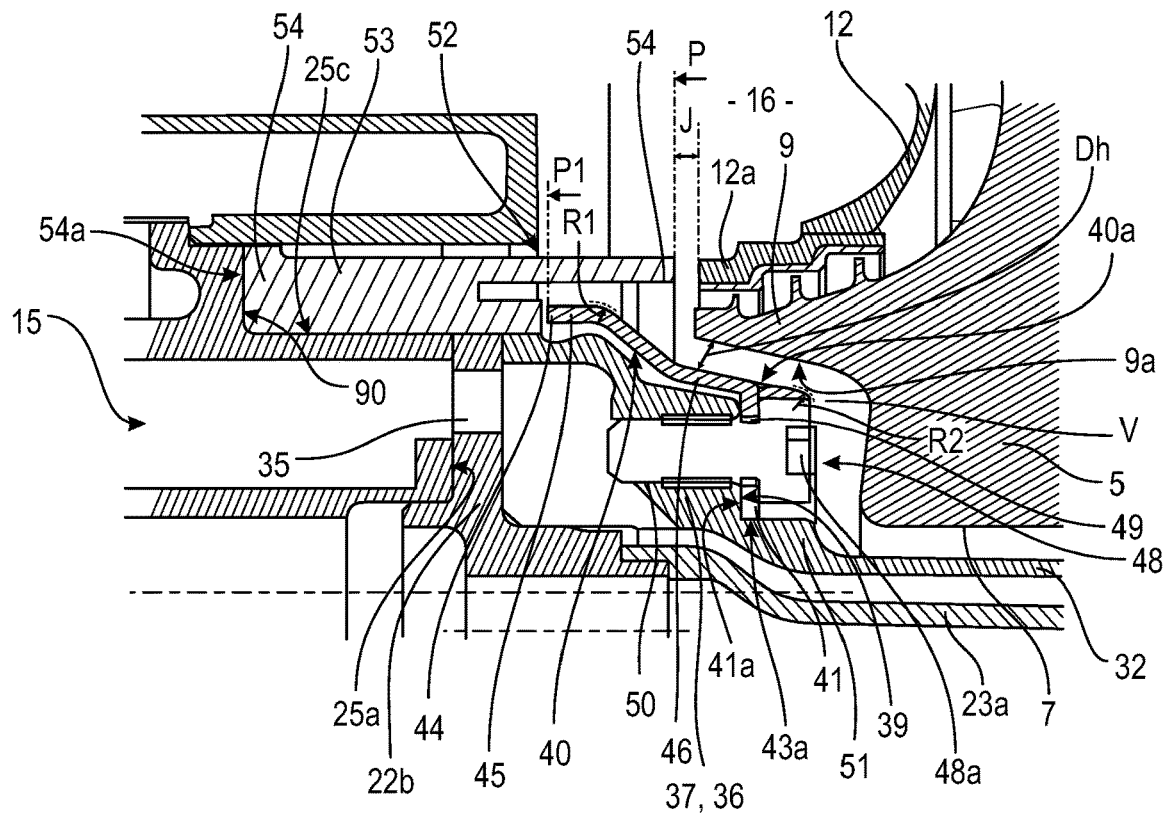
FIG. 6 is an axial cross-sectional view of a fire safety system arranged in a pressurized cavity of a turbomachine according to the disclosure.
Figure 7:
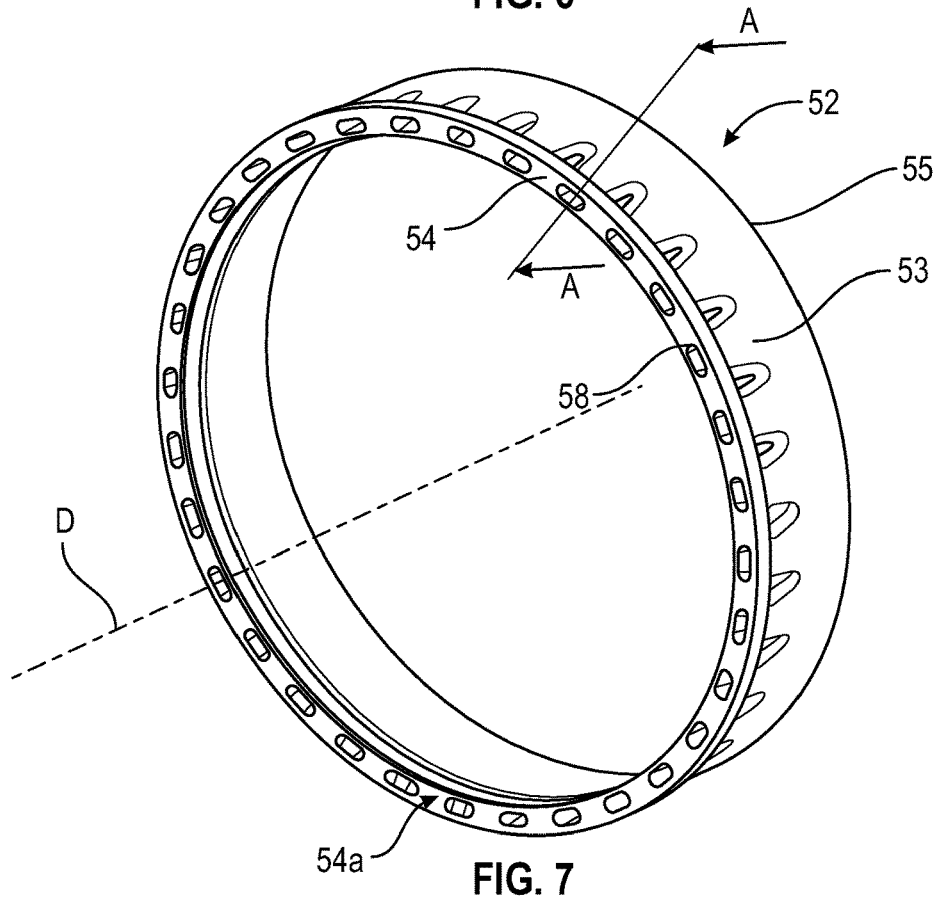
FIG. 7 shows a perspective view of an example of an adaptation member for adapting an air flow rate towards another member of the turbomachine according to the disclosure.

In FIG. 7, the diffuser 52 is annular and comprises a shape of revolution about an axis D. The axis D is coaxial with the axis of the turbomachine 1 when installed. The diffuser 52 comprises an annular wall 53 which extends along the axis D. The annular wall 53 is delimited upstream by an upstream edge 54 and downstream by a downstream edge 55. The upstream edge 54 and the downstream edge 55 are opposite each other along the axis D. The upstream edge 54 has a surface 54a which is defined in a plane which is perpendicular to the axis D. The surface 54a is intended to bear against a support surface 90 (see FIG. 6) of the rear bearing housing 15. In particular, the annular support surface 90 is defined in a plane which is perpendicular to the longitudinal axis X. The support surface 90 is formed by a shoulder which also forms the radial segment 25. The support surface 90 is also located upstream of the downstream support surface 25a. The injectors 17 of the cooling device 14 open into the support surface 90.

The annular wall 53 of the diffuser 52 has an internal diameter which is greater than the external diameter of the annular edge (delimited by the annular surface 22c) of the first radial flange 22b. Similarly, the diameter of the annular wall 53 is greater than the diameter of the radial segment 25 (delimited by the surface 25c).

The diffuser 52 installed in the annular cavity divides it into a first cavity 16a and into a second cavity 16b. The second cavity 16b is located radially outside the diffuser 52 and is considered a dead cavity since no cooling air is intended to circulate through it. The first cavity 16a is located radially inside the diffuser 52. Most of the cooling air is directed towards the first cavity 16a, which forms a cooling air duct V.

The diffuser 52 extends along the longitudinal axis between the injection means (injectors 17) and the radially internal end 12a of the first flask 12 (and/or a distal end of the annular rim 9 of the disc). The annular wall 53 has a length L1 which is greater than the length of the radial segment 25 (and in particular of the surface 25c of the radial segment 25). In the installed position, the upstream edge 54 bears against the support surface 90 and at least a segment of the radially internal surface of the annular wall 53 is in contact with the radially external surface 25c of the housing 15.

As also illustrated in FIGS. 2 and 6, the downstream edge 55 of the diffuser is close to the radially internal end 12a of the first flask 12. The length L1 is substantially equal to the distance between the outlet of the injection means (injectors 17) and the radially internal end 12a of the first flask 12.

A flow rate of cooling air circulates in the sealing device 11 and a flow rate of cooling air circulates in the flow duct V. A clearance J remains between the downstream edge 55 and this radially internal end 12a. However, the cooling air does not circulate through this clearance J. The clearance J allows for thermal expansion of the parts, particularly of the diffuser and of the flask. Advantageously, the clearance is less than or equal to 1 mm.

Figure 8:
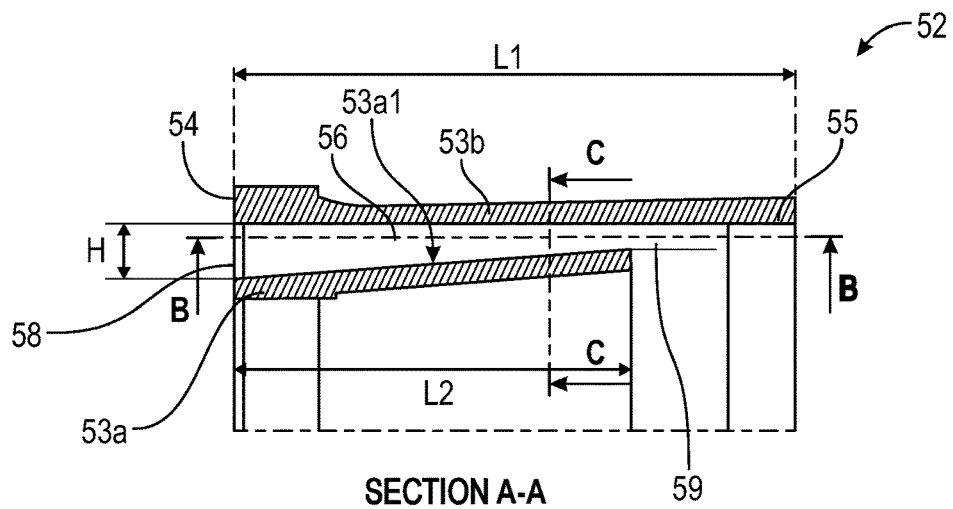
FIG. 8 is a view along an axial section AA of a channel of the adaptation member for adapting an air flow of FIG. 7.
Figure 9:
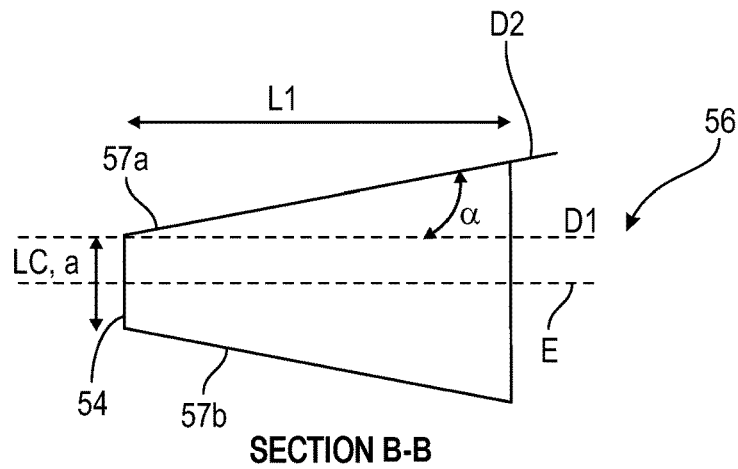
FIG. 9 is a section BB view of the channel shown in FIG. 8.
Figure 10:
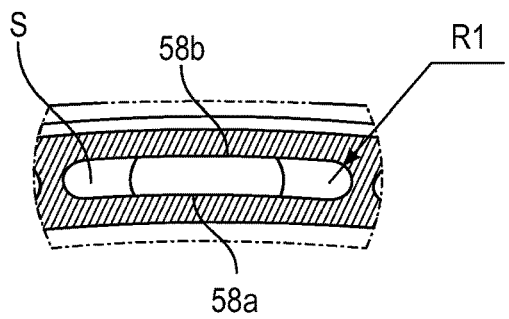
FIG. 10 is a CC section view of the channel shown in FIG. 8.

With reference to FIGS. 8 to 10, the diffuser 52 comprises a plurality of channels 56 which are formed in the thickness of the annular wall 53. The channels 56 are intended to be in fluidic communication with the injection means (in particular the injectors 17) of the housing 15. There are as many channels as there are injectors 17. There are therefore thirty-two channels 56, evenly distributed around the axis D. Each injector 17 opens into a channel 56.

The channels 56 form a radially internal wall 53a and a radially external wall 53b. The radially internal wall 53b has a length L2 less than the length of the radially external wall 53b. The length L2 is measured between a first upstream end and a first downstream end. The length of the radially external wall 53b corresponds to the length L1 of the annular wall 53. The radially external wall comprises a second downstream end downstream of the first downstream end. The second downstream end forms the downstream edge 55 of the diffuser 52. Each channel 56 is delimited by the radially internal wall 53b and the radially external wall 53a, which are connected by a first flank 57a and a second flank 57b. The first and second flanks 57a, 57b are opposite each other in the circumferential direction (around the axis D).

Advantageously, the channels 56 have an evolving profile so as to be able to guide the flow and control the flow speed of the cooling air through the diffuser 52 and into the cavity. By "evolving profile" we mean having a variation in shape, thickness and/or dimensions along one or more sections. The channels 56 each open into the upstream edge 54 through a plurality of slits 58. In particular, each slit 58 opens into the surface 54a. The slits 58 are arranged around the axis of the diffuser 52. Advantageously, but not exclusively, the slits 58 are evenly spaced and distributed around the axis of the diffuser. In this example, each slit 58 has an elongated (or oblong) shape in the circumferential direction (around the axis D). The channels 56 also open into an annular opening 59 at the level of the downstream edge 55. The annular opening 59 is a single opening.

The evolving profile of the channels 56 is obtained by varying their radial height and circumferential width. More specifically, each channel 56 has a radial height H that varies between the upstream edge 54 and the downstream edge 55. More specifically, the height H decreases from the upstream edge 54 towards the downstream edge 55. In other words, the height at the level of the slit 58 is greater than the height at the level of the downstream edge 55. Each channel 56 also has a circumferential width LC, measured between the first and the second flank 57a, 57b, which varies between the upstream edge 54 and the downstream edge 55. The circumferential width LC increases from the upstream edge 54 towards the downstream edge 55.

The cross-section of each channel is approximately constant (+/−20%). In particular, the variation in height H and circumferential width LC is substantially constant. In this way, the cross-section of the channels 56 changes little and the flow velocity also changes little, thus remaining virtually constant between the inlet and the outlet of the diffuser 52 while directing the cooling air correctly to cool the disc 5 of the free turbine.

In this example of embodiment, each slit 58 comprises a height of between 3 and 4 mm. This comprises a width LC between 7 and 8.5 mm. This also comprises a slit height corresponding to the height of the channel at the level of the slit (channel entrance).

In FIG. 10, each slit 58 also comprises a connecting radius R1 of the order of 1.7 mm between the first edge 58a and the second edge 58b of the slit, between which the height of the slit is measured. This connecting radius is substantially identical between the radially internal wall and the radially external wall at the level of the flanks.

Each section S of a channel 56 of the diffuser 52 (in a plane perpendicular to the axis D of the diffuser) is smaller than the ratio D/ρST. In this way, the shape of the channel allows to maintain the flow speed from the inlet (slit) to the outlet (opening) of each channel of the diffuser 52. S is the cross-sectional area of each channel 56, p is the density of the cooling air leaving the injection means, ST is the flame speed and D is the mass flow rate of the cooling air. The cross-section of each channel can be between 26 and 31 mm$^2$.

FIG. 9 shows a section following the section BB of FIG. 8 (in the circumferential direction). In this section, we can see that a channel 56 has a cross-section that is more or less frustoconical in shape and, in particular, straight. The flanks 57a, 57b of each channel 56 are inclined at a predetermined angle α (alpha). The predetermined angle α is measured between a first straight line D1 passing through a summit of a slit (corresponding to a channel respectively), parallel to the respective main axis E of the channel 56, and a second straight line D2 tangent with the flank of the channel. Advantageously, but in a non limiting manner, the predetermined angle α is between 9° and 24°.

Advantageously, the shape of the diffuser 56 is obtained by applying the following formula:

$$\alpha < \frac{39}{\sqrt{L/a}}$$

With a being the predetermined angle, L being a predetermined length of the diffuser 52 between the upstream edge 54 and the downstream edge 55 (i.e. the length L1), and "a" being the circumferential width LC (or the diameter of each slit). This formula is an empirical formula which aims to identify the angle at which a delamination occurs. Numerous experimental tests were carried out on the diffuser to characterise the various parameters. The formula is described, for example, in the publication "Memento des pertes de charges", I-E. Idel'cik, Ed. Eyrolles, Paris, 1986.

Advantageously, but without limitation, the diffuser 52 comprises sealing means arranged between the channels 56 in the circumferential direction. The sealing means comprise the divider walls between the channels.

Advantageously, the diffuser 52 is carried out by an additive manufacturing method or selective powder fusion. In this way, it is made from a single piece of material (came from one material). The additive manufacturing allows to produce complex geometries and single-piece parts (came from one material). Preferably, but not exclusively, the additive manufacturing is a laser fusion method on a powder bed known by the acronym SLM for "Selective Laser Melting". The method is carried out using an installation in which several layers of material, in particular in powder form, are superimposed on a manufacturing support. The layers of powder from a supply reservoir are transferred to the fabrication support and then melted one after the other by means of a laser beam travelling over the surface of each layer. With the additive manufacturing method, channels with such an evolving profile that is both convergent (radially) and divergent (in the azimuthal direction), as well as such small dimensions, can be produced in a single piece. Similarly, as the diffuser 52 is produced by additive manufacturing, the inter-channel walls forming the sealing means are continuous and step-free, which guarantees a very good sealing.

The diffuser 52 is made of a metallic material. An example of a metallic material is a nickel-based alloy such as Inconel 718. Such a material has high thermomechanical strength.

Figure 5:
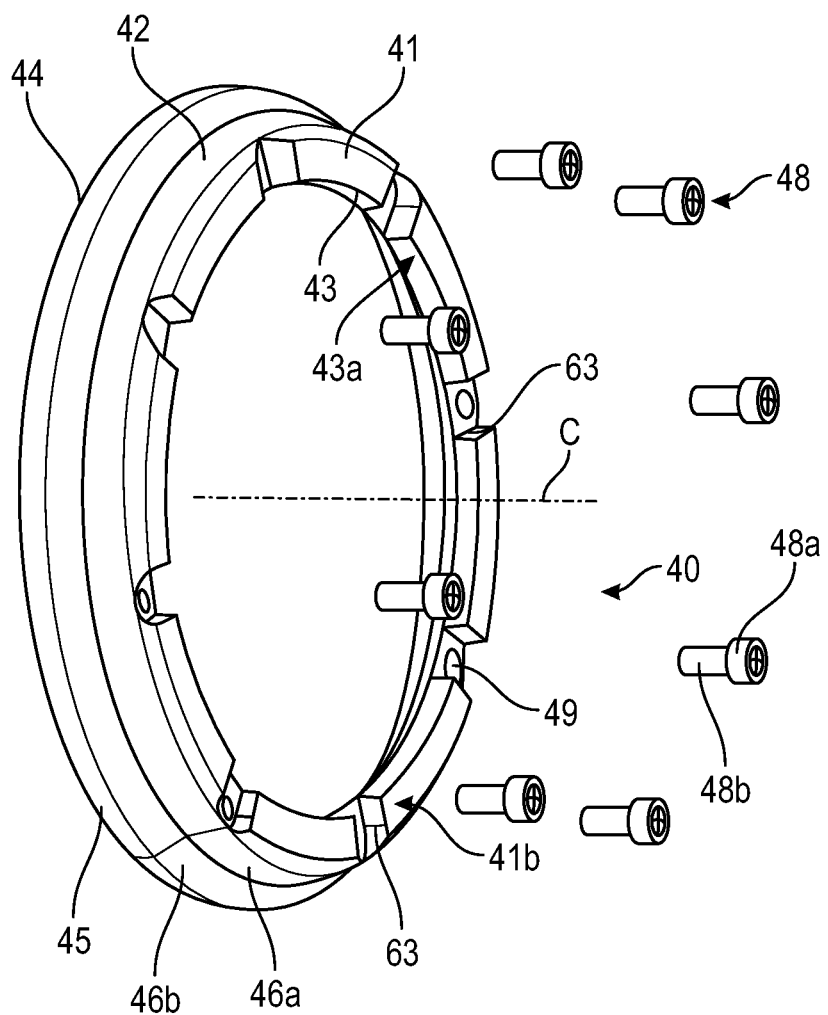
FIG. 5 is a perspective view of an example of a guide member for guiding the cooling air according to the disclosure.

With reference to FIGS. 2, 5 and 5, the fire safety system 30 also comprises an annular cowling 40 intended to cooperate with the diffuser. Advantageously, but without limitation, the cowling is mounted on the cover 31. Generally speaking, as illustrated, the cowling 40 cooperates with the diffuser 52 to form a segment of the cooling air flow duct V.

More specifically, the cowling 40 comprises a shape of revolution about an axis C. The axis C is coaxial with the longitudinal axis X of the turbomachine when installed. The cowling 40 is designed to cover the first attachment members 27 so as to prevent air recirculation through them. As shown in FIG. 1, the first attachment members 27 are arranged in the first cavity 16a and are located downstream of the injection means 17. In the absence of the cowling, the recirculation creates turbulence which, by its very nature, encourages the flames to catch. The cowling 40 prevents turbulence and reduces the passage cross-section under the disc, thereby accelerating the speed of the cooling air. To this end, the first radial flange 22b of the bearing support 21 is mounted on the housing 15 which comprises a cooling air circuit segment. The cooling air leaving the injectors 17 is injected in a direction parallel to the longitudinal axis and radially outside the cowling 40. The cooling air circulates in the first cavity 16a (flow air duct V).

The cowling 40 and the diffuser 52 form the means for maintaining the speed and guiding the cooling air into the cavity (in particular the first cavity 16a) and into the bore of the disc. In particular, the diffuser 52 and the cowling 40 are configured so that the cooling air leaving the diffuser is intended to be guided at least in part by a radially external surface of the cowling.

With reference to FIG. 6, fitting and attaching the cowling 40 to the cover 31 allows a segment of a cooling air flow duct V to be reconfigured between the disc 5 and the cowling 40. In this way, the cooling air no longer circulates around the screws (attachment members 27) which are covered by the cowling. In particular, the reconfigured cooling air flow duct segment V is delimited at least in part by a radially internal surface 9a of the annular rim 9 and a radially external surface 40a of the cowling. The internal diameter delimited by the radially internal surface 9a is greater than the external diameter of the annular skirt of the cowling (described below) and defined by a radially external surface.

The cooling air flow duct V has a height Dh which is substantially constant between the annular rim and the internal bore 7 of the disc 5.

In FIG. 5, the cowling 40 comprises a bottom wall 41 from which an annular skirt 42 rises. A central bore 43 passes through the bottom wall 41 along the axis C of the cover. The central bore 43 defines an internal annular surface 43a. The annular skirt 42 extends along the axis C between the bottom wall 41 and an upstream annular border 44. The annular wall 32 of the cover 31 is designed to pass through the central bore 43 of the bottom wall 41 of the cowling 40. Advantageously, the internal diameter of the annular skirt 42 of the cowling 40 is greater than the external diameter of the annular wall of the cover 31 so as to cover the first attachment members 27.

In the example shown, the diameter of the annular skirt 42 varies between the bottom wall 41 and the annular border 44. In particular, the annular skirt 42 has a decreasing diameter from the annular border 44 to the bottom wall 41. In FIG. 2, the annular border is defined in a radial plane P1 which is upstream of a radial plane P2 in which the support surface of a screw head 27a of the first attachment members 27 is defined. In other words, the annular border 44 at least partly overlaps the projections 37 on the cover. This allows that the screws are well covered. The stem 27b connected to the screw head 27a extends through the holes 24, 35 in the flanges 22b, 33.

More precisely still and with reference to FIGS. 5 and 6, the annular skirt 42 comprises a tubular bearing surface 45 which comprises the annular border 44. The annular skirt 42 also comprises a substantially frustoconical segment 46 which connects the tubular segment to the bottom wall 41.

Advantageously, the cowling 40 comprises a first predetermined radius of curvature "r1" which is arranged between the tubular segment 45 and the frustoconical segment 46 and a second predetermined radius of curvature "r2" which is arranged between the frustoconical segment 46 and the bottom wall 41. In the example shown, the first and second radii of curvature are identical.

The ratio between the predetermined radius of curvature (r1, r2) and the height Dh of the cooling air flow duct V is greater than 1. Such a ratio allows to maintain the speed and avoid the recirculation of the cooling air leaving the injection means towards the internal bore of the disc 5. An example of a radius of curvature is between 2 and 3 mm.

According to an example of embodiment illustrated in FIG. 5, the substantially frustoconical segment comprises a first frustoconical segment 46a which is connected to the bottom wall 41 and a second frustoconical segment 46b which is arranged between the tubular segment 45 and the first frustoconical segment 46a. Alternatively, the annular skirt 42 comprises a single frustoconical segment whose diameter variation is constant. The radii of curvature r1, r2 are arranged at the same points.

The bottom wall 41 is intended to be attached to the annular bearing surface 36 of the cover 31 by second attachment members 48 illustrated in FIGS. 5 and 6. The second attachment members 48 may be screws, stems and/or bolts, etc. The bottom wall 41 comprises a plurality of third holes 49 which pass through the wall on either side along an axis parallel to the axis C. These third holes 49 are intended to cooperate with fourth holes 50 which are arranged in the annular bearing surface 36 of the cover 31. The bottom wall 41 comprises an upstream surface 41a (see FIG. 6) which is defined in a plane perpendicular to the longitudinal axis X. The upstream surface 41a bears against the annular support surface 39 of the cover. The fourth holes 50 pass through the wall of the projections 37 on either side along the axis B as shown in FIGS. 4, 5 and 6.

With reference to FIG. 5, the bottom wall 41 comprises housings 63, each of which opens into a third hole 49. Each housing 63 also opens onto a downstream surface 41b of the bottom wall 41. The downstream surface 41b is opposite the upstream surface 41a along the axis of the cowling 40 (longitudinal axis in the installation situation). In this example, the housing 63 is a recess made in the thickness of the bottom wall 41. Each of the housings 63 also opens onto the internal annular surface 43a of the central bore of the cowling 40. Alternatively, the housings can be formed by counterbores. Here, the second attachment members are advantageously screws each having a head 48a and a stem 48b. Each head 48a is housed and contained in a housing 63. The heads do not protrude from the housing 63 (particularly when the attachment members 48 are mounted in the cowling 40 and the cover 31). In other words, the height of the housing along the longitudinal axis is equal to or greater than the height of a head 48a. This allows to prevent recirculation and obstruction of the flow duct V. The number of attachment members is between 4 and 8.

Advantageously, but a non limiting manner, certain projections 37 comprise the fourth holes 50. In this example, first projections 370 without holes are arranged alternately with second projections 371 with holes in the circumferential direction. In other words, every other projection comprises a fourth hole 50.

Advantageously, the internal annular surface 43a of the central bore 43 of the cowling 40 is intended to be in contact (or in abutment) by complementarity of shape with an annular bearing surface 31a (see FIG. 4) of the cover 31. The annular bearing surface 31a is defined by a shoulder 51 (visible in FIG. 6) arranged between the annular bearing surface 36 (projections 37) of the cover 31 and the annular wall 32.

In FIGS. 2 and 5, the annular border 44 of the cowling 40 is located adjacent to a first downstream end of the radially internal wall 53a of the diffuser 52. A very small clearance of a few millimeters (of the order of 5 mm) is provided between the downstream end of the radially internal wall 53a of the diffuser 52 and the annular border 44 of the cowling. The diffuser extends at least partially radially outwards from a segment of the rear bearing housing, of the bearing support, of the cover and also of the cowling. Similarly, the downstream edge 55 of the diffuser 52 (and carried by the radially external wall 53b) of the diffuser 52 extends radially outside the cover 31 and downstream of the annular border 44. The downstream edge 55 of the diffuser 52 is defined in a plane P located downstream of the plane P1. The downstream edge 55 extends radially outside the cowling 40 and away from the cowling 40. The downstream edge 55 (of a wall segment which extends the radially external wall 53b) covers a segment of the cowling 40 so that the cooling air circulates around the cowling 40. In this way, the cooling air leaving the diffuser 52 is guided at least in part by the radially external surface 40a of the cowling 40. Advantageously, but without limitation, the radially internal wall 53a has a radially internal surface 53a1 which has a surface continuity with the radially external surface of the cowling 40.

It is understood that the cooling air leaving the channels 56 circulates in a segment of the flow duct formed by a segment of the radially external wall 53b and a segment of the wall of the cowling 40.

The fire safety system has been described in relation to an annular cavity provided upstream of a free turbine disc but can be arranged in a cavity upstream of a connected turbine disc in which a flow of cooling air circulates.

We will now describe the method for mounting the fire safety system 30 in the turbomachine. The method comprises a step of providing the sealing system comprising the diffuser 52 and the cowling 40. Beforehand, the method comprises a step of positioning and attaching the bearing support 21 in the turbomachine. The method then comprises a step of positioning the cover 31 around the bearing support 21. The cover 31 is positioned so that the first and second holes 24, 35 face each other. In this example, the cross-sections of the first and second holes are circular. The first attachment members 27 are then mounted to attach the radial flange 22b of the bearing support 21 and the radial flange 33 of the cover 31.

The method comprises a step of attaching the rear bearing housing 15 to the bearing support 21. Advantageously, the cover 31, the bearing support 21 and the housing 15 are attached using the same attachment members 27.

The method comprises a step of positioning the diffuser 52 in the cavity 16. During this step, the diffuser 52 is mounted on the rear bearing housing 15. Advantageously, the diffuser 52 is pre-attached to the housing 15 before the housing 15 is mounted in the cavity 16. The attachment comprises a weld or a bolted connection.

The housing 15 is also mounted with the structural part 28.

The method also comprises a step of positioning the cowling 40 onto the cover 31. The cowling 40 is installed so that the bottom wall 41 is in contact with the annular bearing surface 36 of the cover 31. The fourth holes 50 in the cowling 40 are also positioned so that they face the holes 49 of the cover 31.

The method also comprises a step for attaching the cowling 40 to the cover 31. During this step, the attachment members 48, such as screws, are engaged in the holes in the cover 31 and of the cowling 40.

The cooling air leaving the injectors 17 enters each channel 56 and is then guided towards the cooling air flow duct V, maintaining its speed from the outlet of the injectors 17. The flow velocity of the cooling air is greater than any flame speed generated in the cavity by a possible fire.

The invention claimed is:

1. An assembly for a turbomachine, the assembly comprising at least one turbine having a turbine disc, an annular cavity arranged upstream of the turbine disc which comprises an internal bore and a cooling device configured to supply the annular cavity with cooling air via injection means, the assembly further comprising a fire safety system having means configured to divide the annular cavity into a first cavity and a second cavity and, to maintain a speed of the cooling air at the outlet of the injection means and to guide the cooling air in the first cavity towards the internal bore of the turbine disc, the means comprising a diffuser cooperating with the injection means and an annular cowling configured to cooperate with the diffuser and to cover first attachment arranged in the annular cavity, the diffuser and the annular cowling being configured such that the cooling air leaving the diffuser is guided at least in part by a radially external surface of the annular cowling.

2. The assembly according to claim 1, wherein the diffuser is annular, extends between an upstream edge and a downstream edge along an axis D and is provided with channels which are formed in the thickness of an annular wall of the diffuser, the channels each having an evolving profile and each opening out in the upstream edge through a plurality of slits and in the downstream edge in an annular opening, the slits being disposed around the axis D and being in fluidic communication with the injection means of the cooling device.

3. The assembly according to claim 2, wherein the diffuser has a predetermined length (L1) between the upstream edge and the downstream edge, the downstream edge being configured to be flush with a radially internal end of a flask mounted upstream of the turbine disc and with a predetermined clearance (J).

4. The assembly according to claim 3, wherein the assembly is produced according to a geometric law defined by the following formula:

$$\alpha < \frac{39}{\sqrt{L/LC}}$$

with α being a predetermined angle measured between a first straight line (D1) passing through a summit of a slit, parallel to a respective main axis (E) of the channels, and a second straight line (D2) tangential to a flank of a channel, L being the predetermined length (L1) of the diffuser and LC being a circumferential width of each slit.

5. The assembly according to claim 4, wherein the annular cowling is configured to be mounted on a cover of the turbomachine and the annular cowling comprises an annular bottom wall configured to be attached to an annular bearing surface of the cover.

6. The assembly according to claim 5, wherein the annular cowling comprises an annular skirt extending from the bottom wall along an axis C of the annular cowling, the annular skirt comprising a tubular segment and a frustoconical segment connecting the tubular segment to the bottom wall along the axis C, the annular cowling further comprising a predetermined radius of curvature (r1, r2) arranged between the tubular segment and the frustoconical segment and between the frustoconical segment and the bottom wall.

7. The assembly according to claim 6, wherein the turbine disc comprises an annular rim extending circumferentially about a longitudinal axis and axially upstream along the longitudinal axis, the fire safety system comprising a segment of a cooling air flow duct (V) which is delimited at least in part by a radially internal surface of the annular rim and the radially external surface of the annular cowling, and the ratio between the predetermined radius of curvature (r1, r2) and a height (Dh) of the cooling air flow duct (V) is greater than 1.

8. The assembly according to claim 5, wherein the annular cowling has an annular border disposed adjacent a downstream end of a radially internal wall of the diffuser, the diffuser comprising a radially external wall having a downstream border which extends radially outwardly of the annular cowling and away from the annular cowling.

9. The assembly according to claim 5, wherein the turbine disc comprises an annular rim extending circumferentially about a longitudinal axis and axially upstream along the longitudinal axis, the fire safety system comprising a segment of a cooling air flow duct (V) which is delimited at least in part by a radially internal surface of the annular rim and the radially external surface of the annular cowling.

10. A turbomachine having a longitudinal axis X and comprising a turbine connected by a shaft providing a mechanical power, an annular cavity arranged upstream of a first stage of the turbine, a cooling device equipped with injection means, and the assembly according to claim 1.

11. The turbomachine according to claim 10, further comprising a bearing support configured to guide a turbine shaft which comprises a first radial flange, and a cover equipped with a second radial flange configured to be attached to the first radial flange by first attachment, the first attachment being regularly distributed around the longitudinal axis X and the cover comprising an annular wall configured to pass through the internal bore of the turbine disc.

12. A fire safety system for a turbomachine, such as an aircraft turbojet or turboprop engine, the turbomachine comprises at least one turbine having a turbine disc, an annular cavity arranged upstream of the turbine disc which comprises an internal bore and a cooling device configured to supply the annular cavity with cooling air via injection means, wherein the fire safety system comprises means configured so as, on the one hand, to divide the annular cavity into a first cavity and into a second cavity and, on the other hand, to maintain a speed of the cooling air at the outlet of the injection means and to guide the cooling air in the first cavity towards the internal bore of the turbine disc, wherein the means comprising a diffuser cooperating with the injection means and an annular cowling configured to cooperate with the diffuser and to cover first attachment arranged in the annular cavity, the diffuser and the annular cowling being configured in such a way that the cooling air leaving the diffuser is guided at least in part by a radially external surface of the annular cowling.

13. A turbomachine having a longitudinal axis X and comprising a turbine connected by a shaft providing a mechanical power, an annular cavity arranged upstream of a first stage of the turbine, a cooling device equipped with injection means, and the fire safety system according to claim 12, the fire safety system being arranged in the annular cavity and the injection means being in fluidic communication with the channels of the cooling system.

* * * * *